(12) United States Patent
Beck et al.

(10) Patent No.: US 7,526,774 B1
(45) Date of Patent: *Apr. 28, 2009

(54) TWO-LEVEL SERVICE MODEL IN OPERATING SYSTEM PARTITIONS

(75) Inventors: John T. Beck, San Jose, CA (US); Daniel B. Price, Mountain View, CA (US); Liane Praza, Redwood City, CA (US); Ozgur C. Leonard, San Mateo, CA (US); Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 699 days.

This patent is subject to a terminal disclaimer.

(21) Appl. No.: 10/761,622

(22) Filed: Jan. 20, 2004

Related U.S. Application Data

(60) Provisional application No. 60/469,558, filed on May 9, 2003.

(51) Int. Cl.
  *G06F 3/00* (2006.01)
  *G06F 9/44* (2006.01)
  *G06F 9/46* (2006.01)
  *G06F 13/00* (2006.01)
(52) U.S. Cl. .................................... 719/320
(58) Field of Classification Search ................ 719/320
See application file for complete search history.

(56) References Cited

U.S. PATENT DOCUMENTS 5,155,809 A  10/1992  Baker et al.

(Continued)

FOREIGN PATENT DOCUMENTS

EP    389151 A2    9/1990

(Continued)

OTHER PUBLICATIONS

Czajkowski, G., "Application isolation in the Java Virtual Machine", 2000, ACM Press, Proceedings of the 15th ACM SIGPLAN Conference on Object-Oriented Programming, Systems, Languages, and Applications, pp. 354-366.*

(Continued)

*Primary Examiner*—Meng-Ai An
*Assistant Examiner*—KimbleAnn Verdi
(74) *Attorney, Agent, or Firm*—Hickman Palermo Truong & Becker LLP

(57) ABSTRACT

The present invention provides, in one embodiment, a multi-level service model operating system environment that may be partitioned into a global zone and one or more non-global zones to isolate processes from processes executing in association with other non-global zones under control of a single kernel instance. In one embodiment, the multi-level service model includes a virtual platform layer and an application layer. The virtual platform layer may include services and resources for supporting the zones, which can be made accessible to the zones in the form of a virtual platform. The application layer may comprise the non-global zones, including an application environment for maintaining a runtime state for the zone's processes and any zone-constructed objects, such as network connections and shared memory segments. In one embodiment, control and management of non-global zones can be provided by a system of states and transitions.

27 Claims, 16 Drawing Sheets

U.S. PATENT DOCUMENTS

| | | | |
|---|---|---|---|
| 5,283,868 A | | 2/1994 | Baker et al. |
| 5,291,597 A | | 3/1994 | Shorter et al. |
| 5,325,517 A | | 6/1994 | Baker et al. |
| 5,325,526 A | | 6/1994 | Cameron et al. |
| 5,345,590 A | * | 9/1994 | Ault et al. .................. 718/1 |
| 5,437,032 A | | 7/1995 | Wolf et al. |
| 5,590,314 A | | 12/1996 | Ueno et al. |
| 5,682,530 A | | 10/1997 | Shimamura |
| 5,784,706 A | | 7/1998 | Oberlin et al. |
| 5,841,869 A | | 11/1998 | Merkling et al. |
| 5,845,116 A | | 12/1998 | Saito et al. |
| 5,925,102 A | | 7/1999 | Eilert et al. |
| 5,963,911 A | | 10/1999 | Walker et al. |
| 5,983,270 A | | 11/1999 | Abraham et al. |
| 6,064,811 A | | 5/2000 | Spilo et al. |
| 6,074,427 A | | 6/2000 | Fought et al. |
| 6,075,938 A | | 6/2000 | Bugnion et al. |
| 6,247,109 B1 | | 6/2001 | Kleinsorge et al. |
| 6,279,046 B1 | | 8/2001 | Armstrong et al. |
| 6,289,462 B1 | * | 9/2001 | McNabb et al. ............... 726/21 |
| 6,356,915 B1 | | 3/2002 | Chtchetkine et al. |
| 6,438,594 B1 | | 8/2002 | Bowman-Amuah |
| 6,557,168 B1 | * | 4/2003 | Czajkowski ................. 717/151 |
| 6,633,963 B1 | | 10/2003 | Ellison et al. |
| 6,681,238 B1 | | 1/2004 | Brice et al. |
| 6,681,258 B1 | | 1/2004 | Ratcliff et al. |
| 6,701,460 B1 | | 3/2004 | Suwandi et al. |
| 6,725,457 B1 | | 4/2004 | Priem et al. |
| 6,738,832 B2 | | 5/2004 | Burr et al. |
| 6,792,514 B2 | | 9/2004 | Kapoor et al. |
| 6,813,766 B2 | | 11/2004 | Hay |
| 6,859,926 B1 | | 2/2005 | Brenner et al. |
| 6,938,169 B1 | | 8/2005 | Caronni et al. |
| 6,944,699 B1 | | 9/2005 | Bugnion et al. |
| 6,957,435 B2 | * | 10/2005 | Armstrong et al. ............ 718/104 |
| 6,961,941 B1 | | 11/2005 | Nelson et al. |
| 6,993,762 B1 | | 1/2006 | Pierre |
| 7,027,463 B2 | | 4/2006 | Mathew et al. |
| 7,051,340 B2 | * | 5/2006 | Fisher et al. ................ 719/328 |
| 7,076,633 B2 | * | 7/2006 | Tormasov et al. ............ 711/203 |
| 7,076,634 B2 | | 7/2006 | Lambeth et al. |
| 7,095,738 B1 | | 8/2006 | Desanti |
| 7,096,469 B1 | | 8/2006 | Kubala et al. |
| 7,099,948 B2 | * | 8/2006 | Tormasov et al. ............ 709/229 |
| 7,103,745 B2 | | 9/2006 | Koning et al. |
| 7,188,120 B1 | | 3/2007 | Leonard et al. |
| 7,194,439 B2 | | 3/2007 | Kassan et al. |
| 7,363,495 B2 | | 4/2008 | Felt et al. |
| 7,461,144 B1 | * | 12/2008 | Beloussov et al. ............ 709/223 |
| 2002/0069369 A1 | | 6/2002 | Tremain |
| 2002/0083367 A1 | | 6/2002 | McBride et al. |
| 2002/0120660 A1 | * | 8/2002 | Hay et al. .................... 709/100 |
| 2002/0156824 A1 | | 10/2002 | Armstrong et al. |
| 2002/0161817 A1 | | 10/2002 | Dorofeev et al. |
| 2002/0173984 A1 | | 11/2002 | Robertson et al. |
| 2002/0174215 A1 | * | 11/2002 | Schaefer ..................... 709/224 |
| 2003/0014466 A1 | * | 1/2003 | Berger et al. ................ 709/102 |
| 2003/0037092 A1 | | 2/2003 | McCarthy et al. |
| 2003/0069939 A1 | | 4/2003 | Russell |
| 2004/0010624 A1 | | 1/2004 | Garofalo et al. |
| 2004/0162914 A1 | | 8/2004 | St. Pierre et al. |
| 2004/0210760 A1 | * | 10/2004 | McGrath et al. ............. 713/190 |
| 2004/0215848 A1 | | 10/2004 | Craddock et al. |
| 2005/0021788 A1 | | 1/2005 | Tucker et al. |

FOREIGN PATENT DOCUMENTS

| | | | |
|---|---|---|---|
| EP | 1043658 | A1 | 10/2000 |
| EP | 1 253 516 | A2 | 10/2002 |
| EP | 1253516 | A2 | 10/2002 |
| EP | 1282038 | A2 | 2/2003 |
| EP | 1300766 | A | 4/2003 |
| WO | WO 00/45262 | * | 8/2000 |

OTHER PUBLICATIONS

Czajkowski, G. and Daynés, L., "Multitasking without comprimise: a virtual machine evolution", Oct. 2001, ACM Press, Proceedings of the 16th ACM SIGPLAN Conference on Object Oriented Programming, Systems, Languages, and Applications, pp. 125-138.*

Osman, S., Subhraveti, D., Su, G., and Nieh, J., "The design and implementation of Zap: a system for migrating computing environments", Dec. 2002, SIGOPS Oper. Syst., Rev. 36, SI, pp. 361-376.*

European Patent Office, "European Search Report," application No. 04252689.7, mailing date Jul. 28, 2005, 3 pages.

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Official Action from EPO for foreign patent application No. 04 252 690.5—221 dated Jun. 10, 2005 (6 pgs)—attached.

Current Claims in EPO patent application No. 04 252 690.5—2211 (9 pgs)—attached.

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. Hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1 &nodoc=0, (2 pgs).

SunSoft, a Sun Microsystems, Inc. Business entitled "File System Administration", © 1994 Sun Microsystems, Inc., (62 pgs).

Poul-Henning Kamp, et al., "Jails: Confining the omnipotent root", 2nd Intl System Administration and Networking Conference Proceedings "SANE 2000", May 22-25, 2000, Maastricht, The Netherlands.

Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.

Hope, Paco, "Using Jails in FreeBSD for Fun and Profit", ;Login: The Magazine of Usenix and Sage, vol. 27, No. 3, Jun. 2002, 9 pages.

Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "Trusted BSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pp. 48-55.

U.S. Appl. No. 10/771,698, filed Feb. 3, 2004, Office Action, Mailing Date Apr. 29, 2008.

U.S. Appl. No. 10/763,147, filed Jan. 21, 2004, Notice of Allowance, Mailing Date Jun. 16, 2008.

U.S. Appl. No. 10/744,360, filed Dec. 22, 2003, Notice of Allowance, Mailing Date Jul. 1, 2008.

European Patent Office, "Communication pursuant to Article 94(3) EPC", Foreign application No. 04 252 690.5—2211, received Jun. 17, 2008, 5 pages.

Current Claims, Foreign application No. 04 252 690.5—2211, 9 pages.

European Patent Office, "Result of Consultation", Application No. 04252689.7-1243, dated Aug. 11, 2008, 2 pages.

Claims, Application No. 04252689.7-1243, 5 pages.

European Search Report from the European Patent Office for Foreign Patent Application No. 04252690.5 (3 pgs).

Claims As Filed in European Patent Application No. 04252690.5 (6 pgs.).

Mc Dougall, Richard, et al., "Resource Management", Prentice Hall, 1999, 25 pages.

\* cited by examiner

```
┌─────────────────────────────────────┐
│ ASSIGN ZONE ID TO THE ZONE AND      │
│ INITIATE A PROCESS TO TRACK KERNAL  │
│ RESOURCES ASSOCIATED WITH           │
│ NON-GLOBAL ZONE                     │
│                 332                 │
└─────────────────┬───────────────────┘
                  ▼
┌─────────────────────────────────────┐
│ MOUNT FILE SYSTEM(S) FOR NON-GLOBAL │
│                ZONE                 │
│                 334                 │
└─────────────────┬───────────────────┘
                  ▼
┌─────────────────────────────────────┐
│       PLUMB NETWORK RESOURCES       │
│                 336                 │
└─────────────────┬───────────────────┘
                  ▼
┌─────────────────────────────────────┐
│    CONFIGURE DEVICES, SET RESOURCE  │
│    CONTROLS, ALLOCATE ZONE CONSOLE  │
│                 338                 │
└─────────────────┬───────────────────┘
                  ▼
              ( RETURN )
```

*Fig. 3D* global# *zoneadm list -cv* ~402

| 401~ID NAME ~403 | STATE ~405 | PATH ~407 |
|---|---|---|
| 0 global | running | / ~404 |
| - my-zone | configured | /aux0/my-zone ~406 |
| - fun | installed | /aux0/fun ~408 |
| 15 nofun | ready | /aux1/nofun ~410 |
| 7 lucky | running | /aux0/lucky ~412 |
| 13 unlucky | shutting_down | /aux1/unlucky ~414 | global# *pgrep -lf zoneadmd* ~420
10819 zoneadmd -z nofun ~422
10227 zoneadmd -z lucky ~424
10304 zoneadmd -z unlucky ~426

*Fig. 4A* global# *zonecfg -z my-zone*   ⟋430 zonecfg: my-zone> create   ⟋432 zonecfg: my-zone> set zonepath=/aux0/my-zone ⟋434 zonecfg: my-zone> add net ⟋436 zonecfg: my-zone:net> set physical=hme0   ⟋438 zonecfg: my-zone:net> set address=129. 146. 126. 203/24   ⟋440 zonecfg: my-zone:net> end   ⟋441 zonecf: my-zone> verify   ⟋442 zonecfg: my-zone> commit   ⟋444 zonecfg: my-zone> ^D global#

*Fig. 4B* global# zoneadm -z my-zone verify ⌢446
/aux0/my-zone must not be world readable.
cannot verify zonepath /aux0/my-zone because of the above errors. ⌢448
zoneadm: zone my-zone failed to verify
global# chmod 700 /aux0/my-zone ⌢450 global# zoneadm -z my-zone verify ⌢452
global# zoneadm -z my-zone install ⌢454 global# zoneadm list -iv ⌢456

| ID | NAME | STATE | PATH |
|---|---|---|---|
| 0 | global | running | / |
| - | my-zone | installed | /aux0/my-zone ⌢458 |

*Fig. 4C* global# *zoneadm -z my-zone ready* ∽460 global# *zoneadm list -v* ∽462

| ID | NAME | STATE | PATH |
|---|---|---|---|
| 0 | global | running | / |
| 1 | my-zone | ready | /aux0/my-zone ∽464 |

*Fig. 4D* global# *zoneadm -z my-zone boot* ∽466 global# *zoneadm list -v* ∽468

| ID | NAME | STATE | PATH |
|---|---|---|---|
| 0 | global | running | / |
| 1 | my-zone | running | /aux0/my-zone ∽470 |

*Fig. 4E* global# *zoneadm list -v* ⎯⎯472

| ID | NAME | STATE | PATH |
|---|---|---|---|
| 0 | global | running | / |
| 1 | my-zone | running | /aux0/my-zone ⎯⎯474 | global# *zoneadm -z my-zone halt* ⎯⎯476
global# *zoneadm list -iv* ⎯⎯478

| ID | NAME | STATE | PATH |
|---|---|---|---|
| 0 | global | running | / |
| - | my-zone | installed | /aux0/my-zone ⎯⎯480 |

*Fig. 4F* global# *zoneadm list -v*  ⟋482

| ID | NAME | STATE | PATH |
|---|---|---|---|
| 0 | global | running | / |
| 1 | my-zone | running | /aux0/my-zone ⟋484 | global# *zoneadm -z my-zone reboot*  ⟋486
global# *zoneadm list -v*  ⟋488

| ID | NAME | STATE | PATH |
|---|---|---|---|
| 0 | global | running | / |
| 2 | my-zone | running | /aux0/my-zone ⟋490 |

*Fig. 4G*

TWO-LEVEL SERVICE MODEL IN OPERATING SYSTEM PARTITIONS

CLAIM OF PRIORITY

This application claims benefit of Provisional Application No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. Such underutilization provides a potential opportunity to the owners of these systems to obtain greater capacity or cost reduction through improving utilization of these computing resources.

A number of approaches could be used to address the problem of improving utilization, including consolidation of multiple applications onto a single hardware platform. Consolidation approaches typically attempt to support the co-existence of multiple applications on a single unit of hardware in order to achieve greater function from fewer hardware platforms. A variety of computing resource management techniques could be used for this purpose.

Such computing resource management extensions, however, must address security and management issues arising from the concurrent execution of multiple applications on a single platform. For example, if web server applications belonging to two or more "untrusting" parties, i.e., market competitors, for example, are co-located on a single hardware platform, neither party will be content with the other party's having access to that party's private information. Some computer system functions, including for example, facilities to allocate and use hardware resources, i.e., network connections, DASD, output devices, and so forth, file system resources and communications resources could be used by one untrusting party to access the information or applications of another party if access is not controlled. Accordingly, in environments where users do not trust each other to perform system resource related tasks, the system administrator may be burdened with responsibility of performing each action involving critical system resources at significant time and expense.

One approach to the utilization and security issues arising in consolidation techniques is to partition machine resources among a number of logical partitions (LPARs) or virtual partitions (VPARs), effectively creating multiple machine images on a single platform. Such logical partitioning approaches potentially provide complete isolation among applications based in different machine images. A number of issues arise, however, with logical partitioning approaches. Such approaches may require implementation of hardware support (such as the introduction of an additional privilege level) to isolate privileged programs such as operating system kernels. Also, logical partitioning may require that the system administrator manage the configuration for the logical partitions and the allocation of resources among the logical partitions.

In another possible approach, one or more instances of operating system images that execute concurrently on a single hardware platform provide a plurality of "Virtual Machines." In such approaches, each virtual machine may be a separate operating system instance that provides isolation for programs running in the virtual machine from other programs running in a second virtual machine. While such virtual machine approaches provide isolation between applications, other issues with such approaches may arise. For example, it may not be necessary, or even desirable to have multiple instances of an entire operating system for some applications. The complexity of administration and management for different operating systems images may weigh in favor of more simplified approaches.

Another approach would be to implement compartmentalization into a number of operating system functions. For example, some operating systems employing hierarchical file systems include a function to provide a level of compartmentalization by limiting file system access to a particular process. Such mechanisms, however, also suffer drawbacks. For example, a process's visibility of the file system name space may be limited to a single subtree of the file system in many implementations. Thus, compartmentalization typically does not extend to the process or networking spaces, making observation and interference by other processes possible.

A yet further approach would be to confine a process and its progeny (i.e., parent and children) to compartmentalized allocations of system resources, i.e., file system, network facilities, and so forth. In this approach, a process placed in such a compartment, termed a "Jail," would have access to allocated system resources, but no visibility nor access to files, processes or network services outside of the Jail. A number of issues arise with the Jails approach, as well. Typically, Jails have no independent existence apart from the process for which the Jail is created. In other words, once the process creating the Jail (and its progeny, if any) terminates, the Jail terminates. Also, a second process cannot "join" a Jail.

SUMMARY

The present invention provides, in one embodiment, a multi-level service model operating system environment that may be partitioned into a global zone and one or more non-global zones to isolate processes from processes executing in association with other non-global zones under control of a single kernel instance.

In one embodiment, the multi-level service model includes a virtual platform layer and an application layer. The virtual platform layer includes services and resources for supporting the zones, which are made accessible to the zones in the form of a virtual platform. The virtual platform can include network interfaces, device interfaces such as the zone console interface, file system interfaces, and a separate instance of a zoneadmd process for controlling each instance of a non-global zone in one embodiment. The virtual platform may be created at start up time and continues to exist even when there are no non-global zones in the operating system environment in one embodiment.

The application layer comprises the non-global zones, including an application environment for maintaining a runtime state for the zone's processes and any zone-constructed objects, such as network connections and shared memory segments. In one embodiment, an application environment is created when a non-global zone is booted and may continue to exist as long as there is at least one process running within the non-global zone.

In one embodiment, before startup, a system administrator configures the zones using administrative commands. When a non-global zone has been configured, it means that an administrator in the global zone has invoked certain services of the operating system to specify all of the configuration parameters for the non-global zone and has saved that configuration in persistent physical storage. In configuring a non-global zone, an administrator may specify a number of different parameters, including, but are not limited to, a zone name, a zone path to the root directory of the zone, specification of one or more file systems to be mounted when the zone is created, specification of any network interfaces, specification of devices to be configured when the zone is created, and any resource controls to be imposed on the non-global zone.

A global administrator may install one or more non-global zones that have been configured. In one embodiment, installation of a non-global zone includes installing files to be used by the processes to be associated with the non-global zone into the root directory allocated for the non-global zone.

The global administrator can make one or more of the installed non-global zones ready, which brings the virtual platform into existence. When zones are made ready, in some embodiments, file systems may be mounted, network interfaces may be plumbed, console devices may be configured and devices associated with the non-global zone may be defined.

One or more of the installed non-global zones may be booted in order to bring the application environment into existence. During the boot process, an initialization process, called init is started. The initialization process searches for applications to initialize in order to start user process running in the zone. In one embodiment, it is not necessary for the zone to have an active user process running within it in even after it has been booted.

The global administrator can shutdown a non-global zone that is in the Running state. In one embodiment, a halt command can be issued to cause a non-global zone to return to the installed state. In one embodiment, halt processing includes unmounting filesystem for the non-global zone, freeing data structures, unplumbing network interfaces and removing configurations for devices associated with the non-global zone. In one embodiment, the global administrator may reboot a non-global zone in order to bring down the non-global zone and then instantiate a new instance of that non-global zone.

Control and management of non-global zones is provided by a system of states and transitions in one embodiment. Initially, the non-global zones are in a zero state. Once the global administrator has configured a non-global zone, the zone transitions to a Configured state. The global administrator can install the non-global zone under the operating system environment to cause the zone to transition to an Installed state. When the installed non-global zone is made ready, the zone enters the Ready state. In transitioning to the Ready state, the virtual platform is brought into existence. The global administrator can boot the non-global zone in the Ready state to activate an initialization process for applications and other user processes within the non-global zone. Once the global administrator boots one or more non-global zones and hence starts the initialization process in that zone, the application environment of the zone is brought into existence and the zone transitions to the Running state.

A global administrator may halt a non-global zone that is in the Running state in order to bring the zone back to the Installed state. In one embodiment, a global administrator that desires to the establish a new instance of a non-global zone presently in the Running state may do so by rebooting the zone to perform a functional equivalent of halting the non-global zone and establishing a new instance of the non-global zone in the Running state.

BRIEF DESCRIPTION OF THE DRAWINGS

FIGS. 3A-3G are operational flow diagrams illustrating the operation of one embodiment of the present invention.

FIGS. 4A-4G are screen shots of various operations in an example embodiment of the present invention.

DETAILED DESCRIPTION OF EMBODIMENT(S)

System Overview

Figure 1:
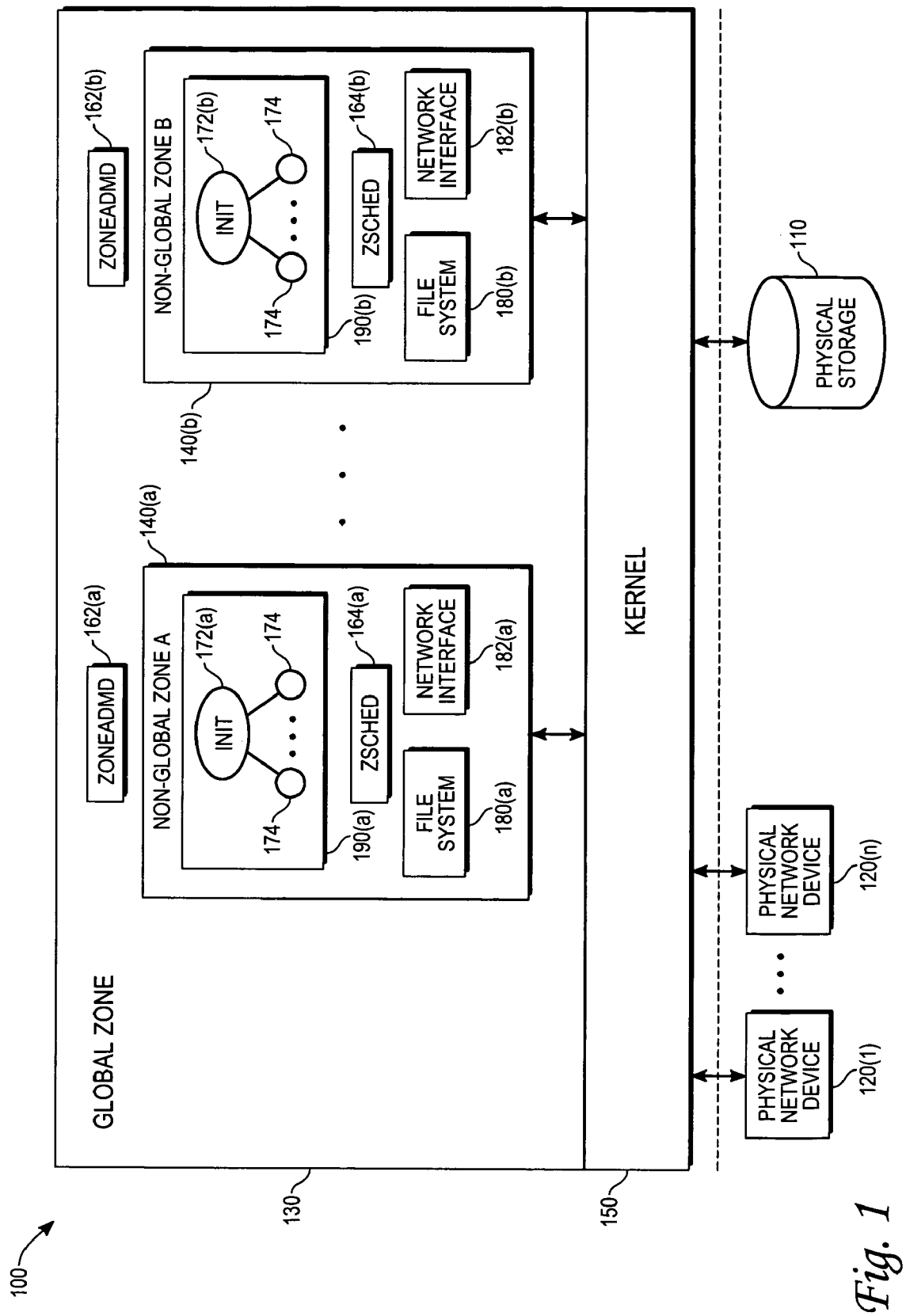
FIG. 1 is a functional block diagram of an example operating system environment in which one embodiment of the present invention may be implemented.

In one embodiment, the present invention provides a multi-level service model for isolating processes executing under an operating system environment partitioned into a global zone and one or more non-global zones controlled by a single kernel instance. In one embodiment, a method is provided that includes establishing a virtual platform comprising support services for zones. The virtual platform can provide, for example, virtualized access to computer and operating system resources to processes in zones. The virtual platform can be created without bringing any zone into existence according to one embodiment. The method also includes establishing a first non-global zone for maintaining a first application environment and a second non-global zone for maintaining a second application environment. The method further includes isolating applications executing in association with the first application environment from applications executing in association with the second application environment. The method can enable the virtual platform to exist for a time period before or after the application environments in one embodiment.

In one embodiment, the method may include starting a first process within the first application environment of the first non-global zone and starting a second process within the second application environment of the second non-global zone. The method includes isolating the first process from the second process. In one embodiment, a runtime state for the first process and a runtime state for the second process may be maintained substantially concurrently and/or independently of one another. The virtual platform can provide virtualized access to computational resources to the first process and the second process. Computational resources can include, in some embodiments, one or more of a network interface, a communications interface, a file system, a system console, a DASD address and an operating system service process.

In one embodiment, isolating the first process and the second process includes permitting the first process to view and access computational objects within the first non-global zone. In one embodiment, a process existing outside of the first non-global zone and the second non-global zone may be selectively permitted to view computational objects within the first non-global zone and the second non-global zone.

In another aspect of the invention, in one embodiment, a plurality of states is used to manage the zones. In one embodiment, establishing a virtual platform includes creating a zone configuration, which can enable the zone to transition from a first state to a Configured state. Installing the zone configuration under the operating system enables the zone to transition from the Configured state to an Installed state. Instantiating processes for providing services in the zone enables the zone to transition from the Installed state to a Ready state. In some embodiments, instantiating processes for providing services may include one or more of starting a scheduler process, establishing network interfaces, mounting file systems, initializing a system console and configuring devices. In one embodiment, establishing a zone includes starting a process for initializing user processes, which enables the zone to transition from the Ready state to a Running state.

In one embodiment, the method may include receiving a command to reboot a non-global zone. In one embodiment, the method includes halting user processes associated with the application environment of the non-global zone and freeing resources allocated to support the non-global zone, enabling a transition from the Running state to the Installed state. Re-instantiating processes for providing services to enable the zone to transition from the Installed state to a Ready state may also be part of the method. The method further includes re-starting a process for initializing user processes to enable the zone to transition from the Ready state to a Running state.

In one embodiment, the method includes halting user processes associated with the application environment of the non-global zone in response to receiving a command to halt a non-global zone. Resources allocated to support the non-global zone are freed, which can enable the zone to transition from the Running state to the Installed state.

In another aspect of the invention, in some embodiments, a global zone comprises processes not associated with the first non-global zone or the second non-global zone. In one embodiment, the method includes permitting processes associated with the global zone to view and access objects in the global zone as well as to view objects in the non-global zones. Processes associated with a non-global zone may be permitted to view and access objects only in the non-global zone. Upon authorized request, a process of the global zone may be selectively permitted to access objects in a non-global zone.

In a further aspect, the invention provides in one embodiment, a computer based method for managing resources in one or more non-global zones in an operating system controlled by a single kernel instance. The method includes a variety of steps, such as a step of establishing a virtual platform. The virtual platform can have an existence independent of the non-global zones. A step of creating a global zone and at least one non-global zone can be part of the method. Each non-global zone may comprise an application environment for isolating applications from applications executing in association with other non-global zones. Each non-global zone may use services of the virtual platform to access devices and services. The method can also include the steps of permitting processes associated with global zone to view and access objects in the global zone and to view objects in the non-global zones. Processes of each non-global zone may be permitted to view and access objects only in the non-global zone. Upon authorized request, a process of the global zone may be permitted to access objects in a non-global zone.

In one embodiment, each zone provides a separate persistent virtual environment. A non-global zone is persistent because a zone may exist for longer period of time than the life of any one process in that zone. The non-global zones are virtual environments because each zone can provide an isolated environment to one or more processes. In one embodiment, each non-global zone includes an application environment that provides a virtual equivalent of a physical machine to processes associated with the zone.

In other aspects, the invention encompasses in some embodiments, computer apparatus, computing systems and computer-readable media configured to carry out the foregoing methods.

Some embodiments can provide secure virtualization and isolation among processes by executing the processes concurrently in one or more non-global zones and provide access to kernel resources via a single virtual platform layer. Some embodiments can provide virtualization and isolation among coexisting, concurrently executing processes, without requiring implementation of hardware support (such as the introduction of an additional privilege level) to isolate privileged programs, and without multiple instances of an operating system kernel for some applications. Some embodiments employing a multi-tiered service model can provide separation of administration tasks, such as between a global administrator and a zone administrator, for example.

FIG. 1 illustrates a functional block diagram of an operating system (OS) environment 100 in accordance with one embodiment of the present invention. OS environment 100 may be derived by executing an OS in a general-purpose computer system, such as computer system 500 illustrated in FIG. 5, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows™, MacOS™, etc.

As shown in FIG. 1, OS environment 100 may comprise one or more zones (also referred to herein as partitions), including a global zone 130 and zero or more non-global zones 140 (e.g. non-global zone 140(a) and 140(b)). The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes executing in application environment 190 (e.g. application environment 190(a) and 190(b)), one or more file systems 180 (e.g. file system 180(a) and 180(b)), and one or more logical network interfaces 182 (e.g. logical network interface 182(a) and 182(b)). Because of this isolation, processes executing in application environment 190 in one non-global zone 140 cannot access or affect processes in any other zone. Similarly, processes executing in application environment 190 in a non-global zone 140 cannot access or affect the file system 180 of another zone, nor can they access or affect the network interface 182 of another zone. As a result, the processes 190 in a non-global zone 140 are limited to accessing and affecting the processes and entities in that zone. Isolated in this manner, each non-global zone 140 behaves like a virtual standalone computer. While processes executing in application environment 190 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes executing in application environment 190 in one non-global zone 140 are not able to access or affect processes executing in application environment 190, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 (e.g. physical network devices 120(1)-120(n)) of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which causes a zoneadmd process 162 (e.g. zoneadmd process 162(a) and 162(b)) to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (e.g. zsched process 164(a) and 164(b)) (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a nonglobal zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 (e.g. init process 172(a) and 172(b)) in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes executing in application environment 190 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Two Tier Operating System Environment

Figure 2A:
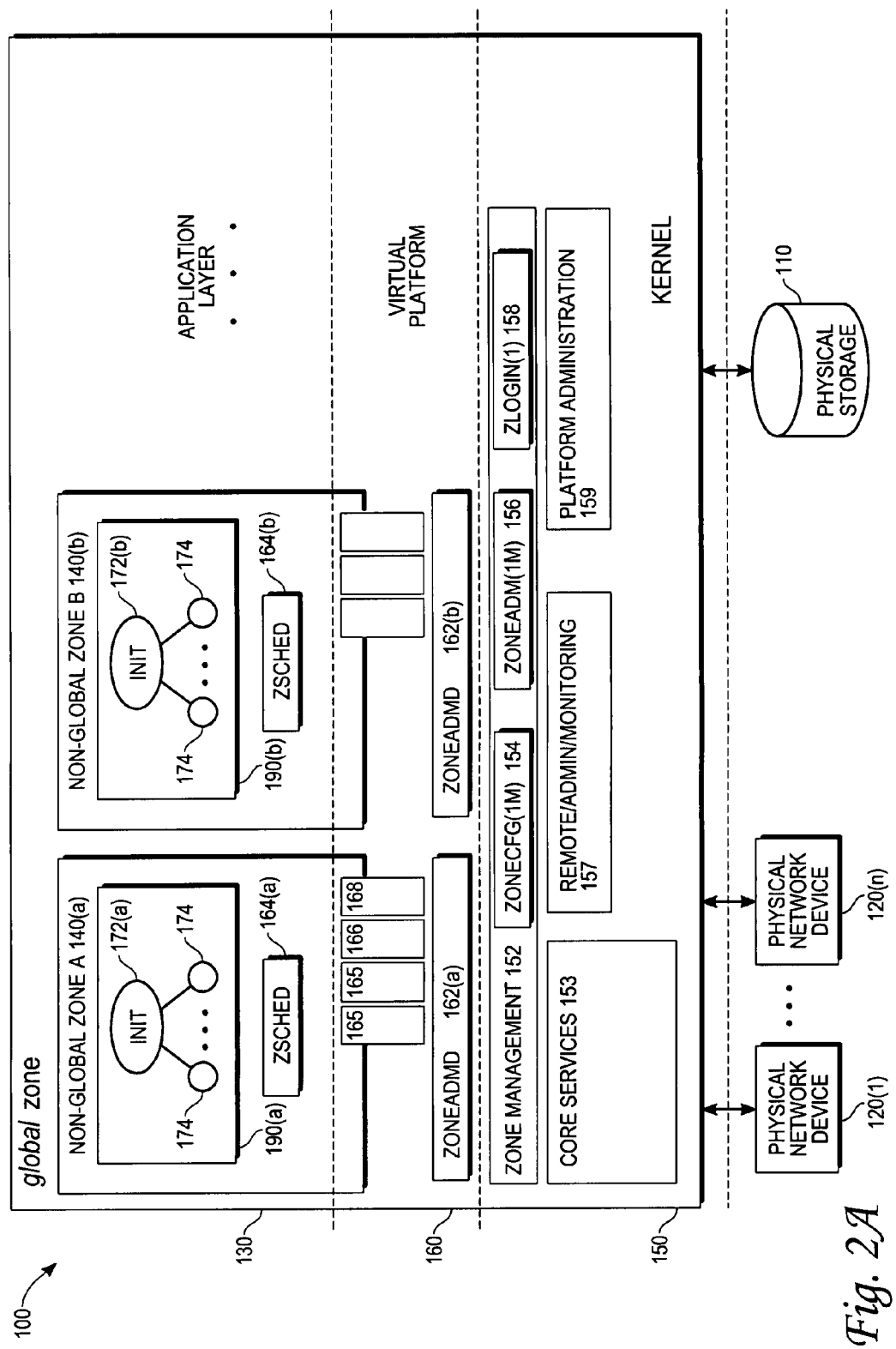
FIG. 2A is a functional block diagram of an example multiple tier service model in the operating system environment of FIG. 1 in one embodiment of the present invention.

FIG. 2A is a functional block diagram of an example multiple tier service model in the operating system environment of FIG. 1 in one embodiment of the present invention. As shown in FIG. 2A, computer operating system environment 100 comprises a virtual platform layer and an application layer. At the virtual platform layer, a virtual platform 160 provides services and resources that provide logical interface to software services and hardware devices that enable non-global zone 140 to function. FIG. 2A illustrates virtual platform 160 comprising an instance of zone administration process, zoneadm 162 for each non-global zone 140 and one or more device interfaces for providing virtualized access to a plurality of hardware devices, such as storage complex 110, physical network devices 120 and a console (not shown in FIG. 2A), for example. Virtual platform 160 includes interface processes, such as logical device interfaces 165 to portions of the file system established for zone 140, a zone console support process 166 for providing zone console support for zone 140 and a network device interface process 168 for connecting processes within zone 140 to one or more physical network devices 120.

At the application layer, each non-global zone 140 comprises an application environment 190 that maintains a runtime state for one or more processes in each of the non-global zones. The application environment 190 includes the processes 174 and objects (not shown), which can include network connections, shared memory segments, child processes and the like, associated with each non-global zone 140. Not all of these items will be present in each zone at all times or in all embodiments.

Virtual platform 160 and application environment 190 may be provided as distinct entities in some embodiments to provide separation of configuration and start up. Such phased start up techniques can provide a rapid deployment capability in applications where it is desirable to maintain the virtual platform's availability to the application environment on demand.

In one embodiment, one or more zone management processes 152 that provide support to the virtual platform and interface to the physical hardware are implemented as part of the kernel 150. These processes may include, in the example embodiment illustrated by FIG. 2A, zonecfg(1M) process 154 that manages the configuring of non-global zones 140, a zoneadm(1M) process 156 that manages and controls activity of the zones via the virtual platform and a zlogin(1) process 158 that implements a login command that may be used by the global administrator to login from the global zone 130 to any non-global zone 140 that is in the Running state or Ready state.

In one embodiment, kernel 150 comprises one or more core services 153 that provide device level interface to the physical hardware for the virtual platform 160. Kernel 150 can further include remote administration and monitoring processes 157 and platform administration processes 159 that provide administrative support and services. Other services and processes not shown in FIG. 2A for clarity will be included in some embodiments.

In some embodiments, the virtual platform 160 is the set of services and resources that allow the zone to function. In one embodiment, virtual platform components include network interfaces, devices, the zoneadmd process 162 and the zone console. The application environment 190 is the virtualized runtime state of processes associated with non-global zone 140. This may include the zone's processes and any zone-constructed objects, such as network connections and shared memory segments.

In one embodiment, a zoneadmd (1M) process 156, provides management of the zone's virtual platform. Further, the zoneadmd(1M) process 156 provides setup and teardown of the application environment 190.

When a global administrator boots a zone, the zoneadmd (1M) process 156 consults the zone configuration configured using zonecfg (1M) 154 and sets up the zone accordingly. In one embodiment, the zoneadm (1M) process 156 performs the following tasks in order to set up a zone: making a zone_create (2) system call to allocate a zone ID and to start the zsched system process; setting zone-wide resource controls; registering the zone with devfsadmd(1M); plumbing virtual network interfaces; mounting loopback and conventional file systems and instantiating and initializing the zone console device.

Individual zone administration processes, zoneadmd process 162, maybe automatically started by the zoneadm(1M) process 156 if the zoneadmd process 162 is not already running. In one embodiment, there is one zoneadmd 162 process running for each active zone, i.e., each zone in any of the Ready, Running, Shutting-Down states in the operating system environment 100. In one embodiment, the individual zone administration processes zoneadmd process 162 may be contacted by user applications in the global zone 130 and the kernel 150.

In one embodiment, each active zone (a zone that is in any state including Ready state through Shutting_down state) has an associated kernel process, zsched process 164. Kernel threads doing work on behalf of the non-global zone 140 are owned by the zone's zsched process 164. Accordingly, the zsched process 164 can enable the zoneadm process 162 to track zone specific kernel threads.

Figure 2B:
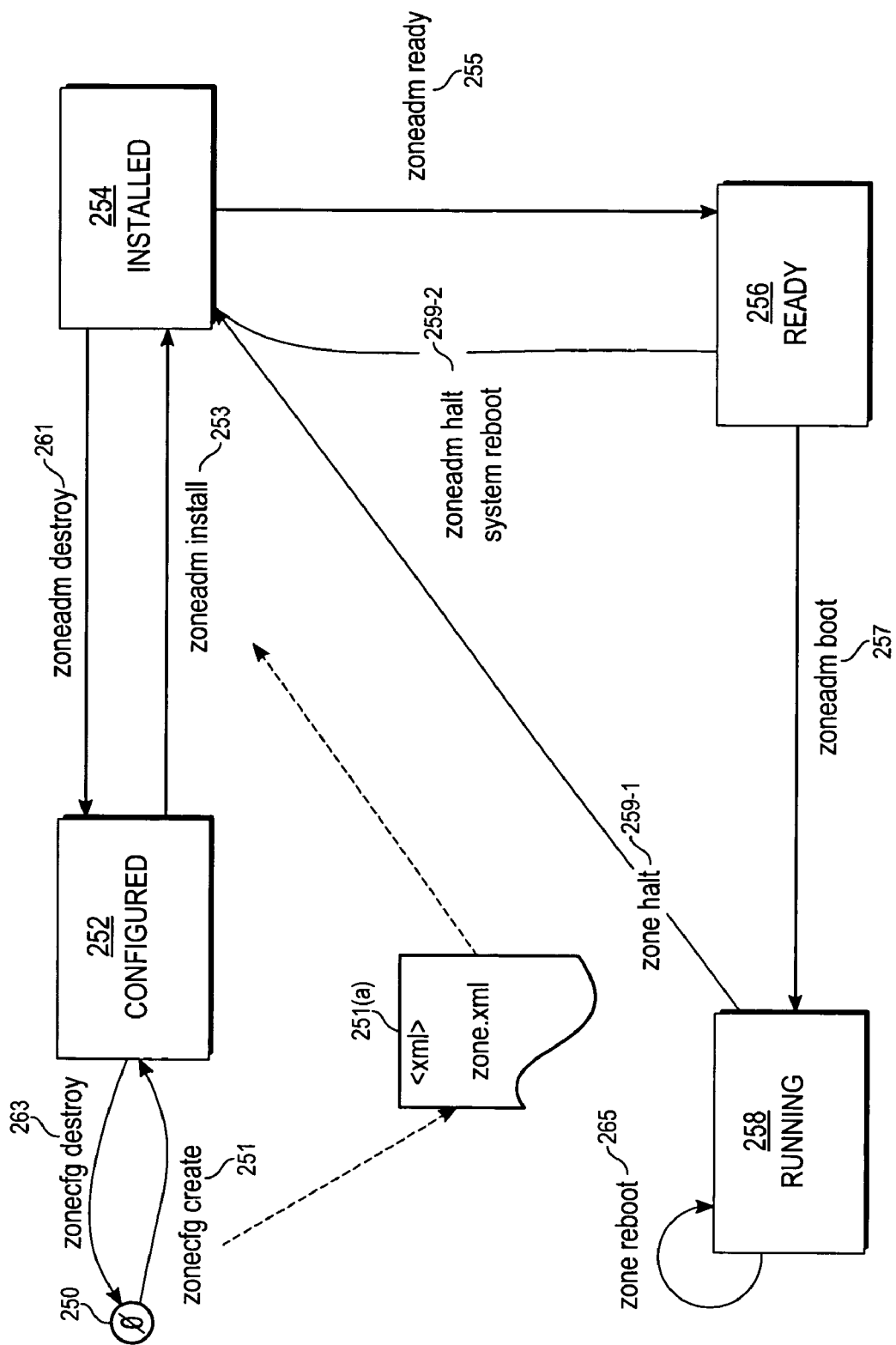
FIG. 2B is an operational state diagram illustrating states and state transitions in the operating system environment of FIG. 2A in accordance with one embodiment of the present invention.

FIG. 2B is a functional block diagram of an operational state diagram illustrating states and state transitions in the operating system environment 100 of FIG. 2A in accordance with one embodiment of the present invention. As shown by FIG. 2B, an initial state, zero state 250 provides a starting point. When the global administrator defines the configuration for a non-global zone 140 using the zonecfg create command 251, the non-global zone 140 enters the Configured state 252. In one embodiment, the zonecfg create command 251 provides as output a zone.XML document 251(*a*), which maybe used by a zoneadm install command 253 to install the zones. The global administrator may issue a zoneadm install command 253 in order to cause the non-global zone 140 to enter the Installed state 254. In the Installed state 254, the zone is installed, but not yet booted. When the zone is placed in the Installed state, the virtual platform is created and is made ready to accept the instantiation of the zone. The global administrator next enters a zoneadm ready command 255 to place the non-global zone 140 into the Ready state 256. When the global administrator enters the zoneadm boot command 257 with a particular zone id, that zone is instantiated, and the non-global zone 140 enters the Running state 258. When the non-global zone is booted, then an application environment for the non-global zone 140 is created when the zone 140 enters the Running state 258.

FIG. 2B further illustrates command processes for taking down the operating system environment 100 in one embodiment. As shown in FIG. 2B, if a zoneadm halt command 259-1 is issued for one or more non-global zone(s) 140 that are instantiated, i.e., in the Running state 258, the non-global zone 140 will then transition to the Installed state 254. The zoneadm halt command 259-2 may also be issued when a non-global zone 140 is in the Ready state 256, in which case the non-global zone 140 will be placed into the Installed state 254 as well. A zoneadm destroy command 261 may be issued for a non-global zone 140 in the Installed state 254 in order to place the non-global zone 140 into the Configured state 252. A zonecfg destroy command 263 issued for a non-global zone 140 the Configured state 252 will place the non-global zone 140 into the zero state 250. A Shutting_down state and a down state (not shown in FIG. 2B) are transitional states, which are visible while a non-global zone 140 is being halted, such as after issuance of a halt command 259. The zone may become stuck in one of these states if the operating system environment 100 is unable to dismantle the application environment, such as un-mounting file systems, or if some portion of the virtual platform cannot be destroyed. In one embodiment, an operator intervention may be requested to resolve the problem.

A zone may be booted by issuing the zoneadm boot command 257 from the Ready state 256 or the Installed state 254. For purposes of clarity, the zoneadm boot command 257 is shown only from the Ready state 256 by FIG. 2B. This command is also applicable, however, from the Installed state 254. In this case, the zoneadm boot command 257 would result in passing through the Ready state 256 on the way to the Running state 258. Additionally, for purposes of clarity, a zone reboot, whether from a zone administrator issuing the zone reboot command 265, or a global administrator issuing zoneadm reboot, is illustrated as a transition from the Running state 258 back to the same state, without going through any other intermediate states on the way. In one embodiment, however, such a zone reboot results in a cycle through the Installed state 254 and Ready state 256 before returning to Running state 258.

Figure 3A:
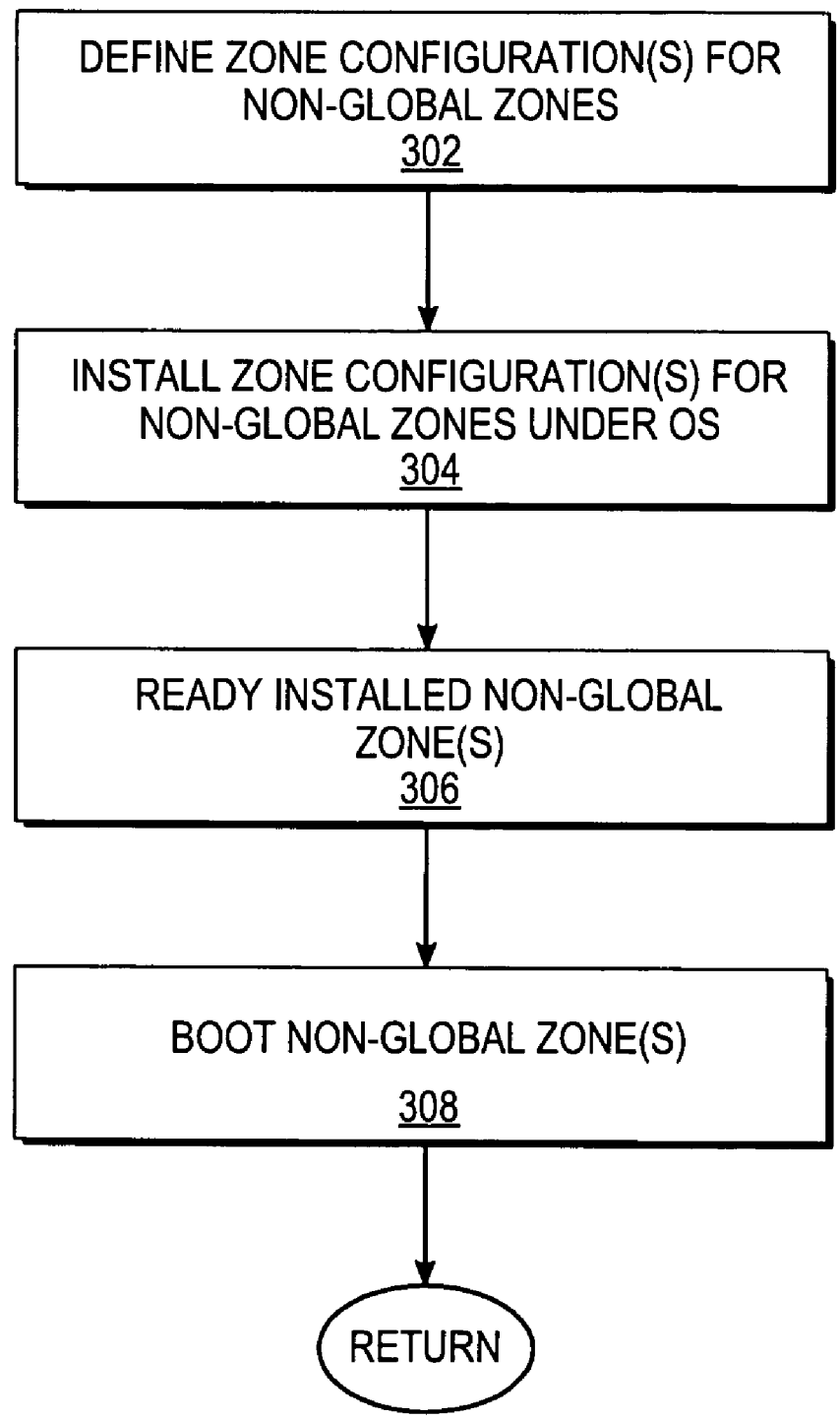

FIGS. 3A-3G are operational flow diagrams illustrating the operation of one embodiment of the present invention. FIG. 3A illustrates an example process for managing zones in operating system environment 100 in one embodiment. In block 302, one or more zone configurations for nonglobal zones 140 are defined, thereby enabling non-global zones 140 to enter the Configured state. In block 304, the zone configurations defined in block 302 are installed, thereby enabling the non-global zones 140 to transition to the Installed state. In block 306, one or more non-global zones 140 are readied to create the virtual platform, and to enable the non-global zones 140 to enter the Ready state. Then in block 308, one or more of the non-global zones 140 are booted in order to create an application environment for each of the non-global zones 140, and to enable the non-global zones 140 to transition to the Running state.

Figure 3B:
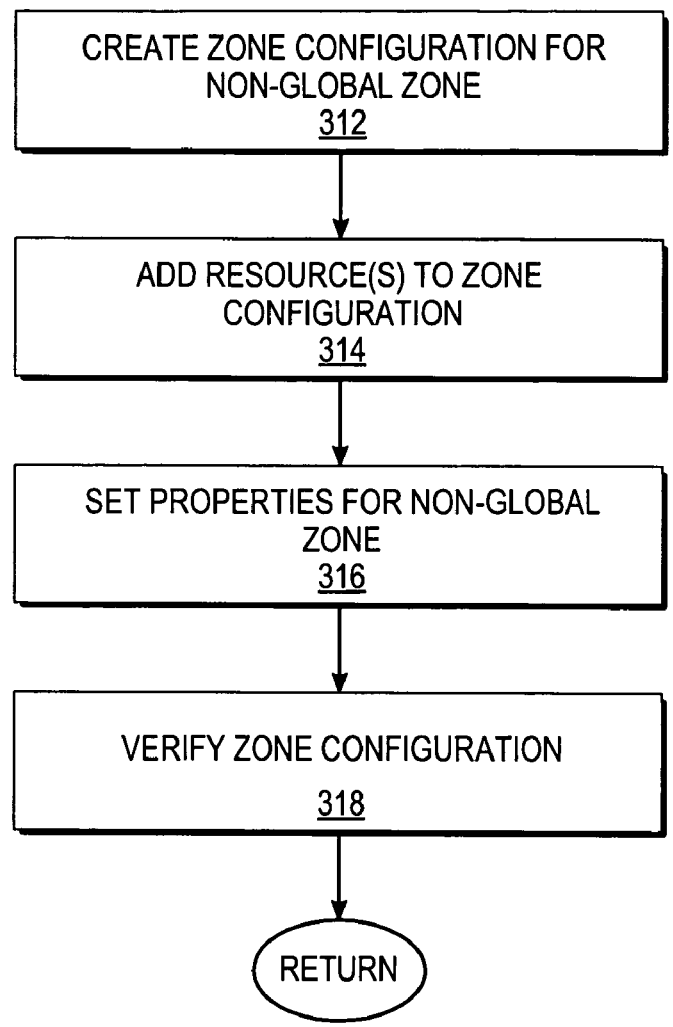

Referring now to FIG. 3B, further details of the zone configuration processing illustrated by FIG. 3A are provided for one representative embodiment. As shown in FIG. 3B, in block 312, a new zone configuration is created. In block 314, one or more resources are added to the configuration. In block 316, properties for the resources are set. In block 318, the zone configuration is verified. In this manner, one or more non-global zones 140 are configured in order to place the non-global zones 140 into the Configured state. In some embodiments, other steps may be included in the process. An example of configuring a zone according to one embodiment of the present invention is described below with reference to FIG. 4B.

Figure 3C:
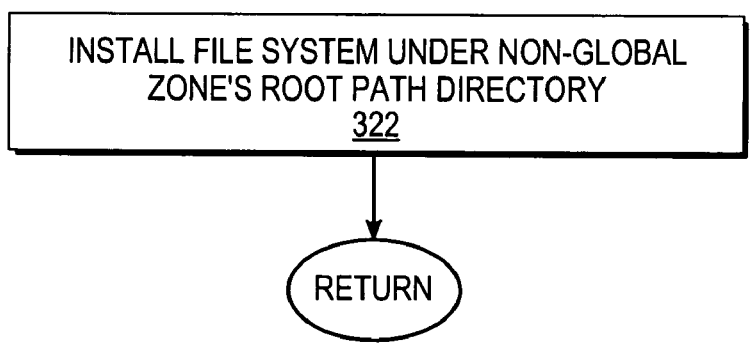

Referring now to FIG. 3C, further details of the zone installation processing illustrated by FIG. 3A are provided for one representative embodiment. As shown in FIG. 3C, in block 322 files used by the zone's root file system are installed under the zone's root path. In the Installed state 254, the zones are installed, but the operating system environment 100 has no virtual platform 160. In one embodiment, each zone has a path to that zone's root directory relative to the zone global zone's root directory. At installation time, this directory will be checked to ensure that it has restricted visibility. In one embodiment, this directory will be owned by the root and have a mode of 700. The significance of mode 700 is that unprivileged users have neither read nor execute permissions, so they cannot "see" anything below that node in the file system. This is used to prevent an unprivileged user in the global zone from conspiring with a privileged user in a non-global zone to escalate privileges. In one embodiment, the zone's root path will be one level lower in the file system that hierarchy. In other words, in this embodiment, the zone's root path will be the directory root under the zone path. In one embodiment, this root directory will have the same ownership and permissions as the root directory in the global zone, i.e., owned by the root and have a mode of 755. In one embodiment, unprivileged users in the global zone may be prevented from traversing a non-global zone's file system hierarchy. An example of installing a zone according to one embodiment of the present invention is described below with reference to FIG. 4C.

Referring now to FIG. 3D, further details of the zone ready processing illustrated by FIG. 3A are provided for one representative embodiment. As shown in FIG. 3D, in block 332, a zone ID is assigned to the zone being readied and a zsched process 164 for the zone is started. In one embodiment, a zone_create (2) system call allocates a zone ID and starts the zsched system process. In block 334, file systems 180 are mounted. In one embodiment, one or more of loopback and conventional file systems are mounted and the non-global zone 140 is registered with devfsadmd(1M). In block 336, network interfaces 182 are plumbed. In block 338, devices associated with the zone are configured and resource controls are set. In one embodiment, the zone console device is instantiated and initialized. These and other steps can establish the virtual platform 160, bringing the non-global zone 140 to the Ready state. In some embodiments, other operations are performed as well. An example of readying a zone according to one embodiment of the present invention is described below with reference to FIG. 4D.

Figure 3E:
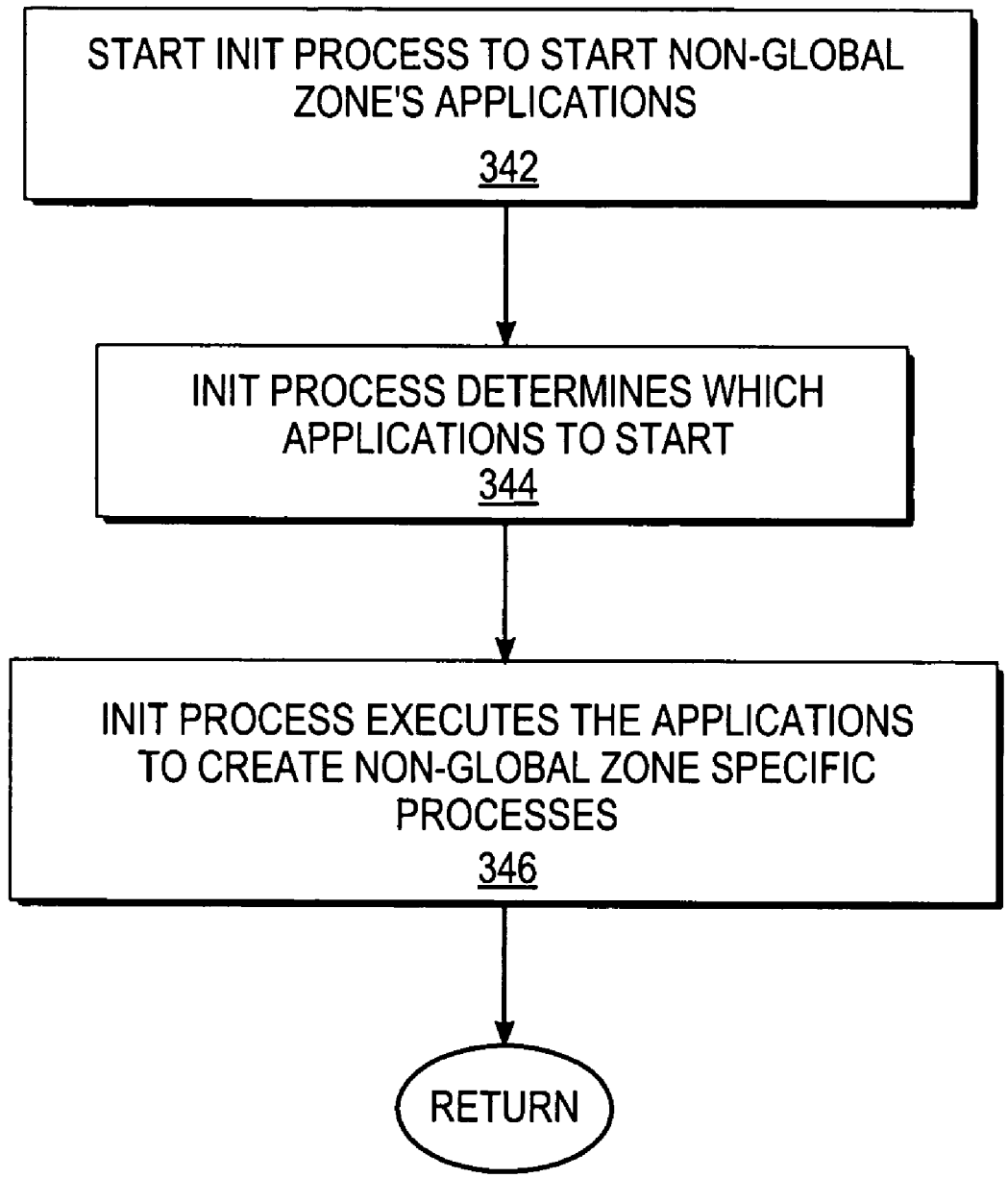

Referring now to FIG. 3E, further details of the zone boot processing illustrated by FIG. 3A are provided for one representative embodiment. After a non-global zone 140 is in the Ready state, it can be transitioned into the Running state by starting a process that initializes user processes in the zone. As shown in FIG. 3E, in block 342, the zoneadmd process 162 for the particular non-global zone starts an init process 172 in its associated non-global zone 140. In block 344, the init process 172 looks in the file system 180 of the non-global zone 140 to determine which applications to run. Then, in block 346, the init process 172 executes those applications to give rise to one or more user processes 174. These and other steps can instantiate the application environment 190 of the non-global zone 140. In this application environment 190, processes are confined to the non-global zone 140. Accordingly, processes cannot access or affect processes, file systems, or network interfaces in other zones. The application environment 190 exists so long as one or more user processes are executing within the non-global zone 140. The virtual platform 160 may exist for a longer period of time. An example of booting a zone according to one embodiment of the present invention is described below with reference to FIG. 4E.

Figure 3F:
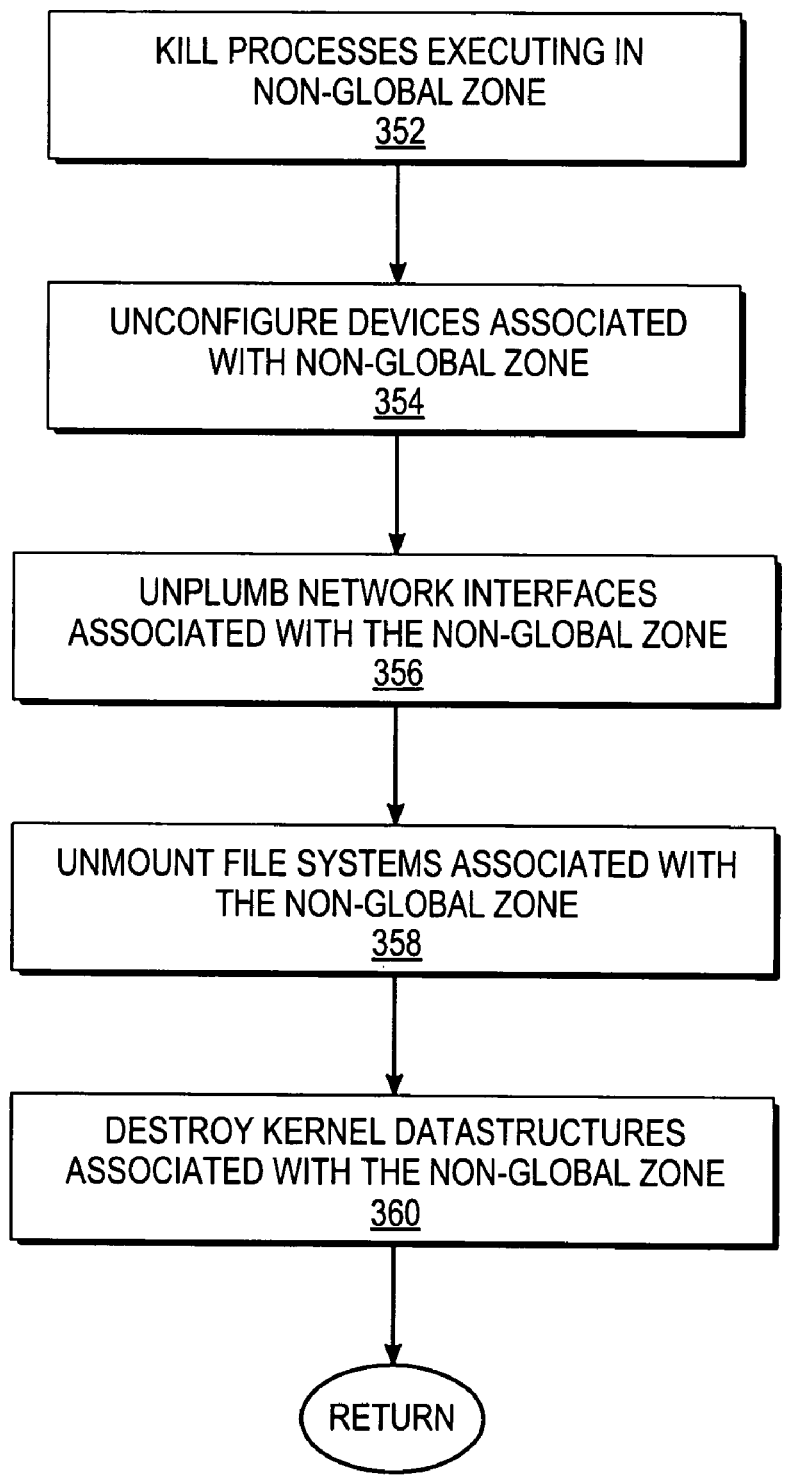

A zone that is in the Running state may be halted by performing the processing depicted by FIG. 3F in one embodiment of the present invention. Referring now to FIG. 3F, a general description of zone halt processing in one representative embodiment is provided. In block 352 processes executing in the non-global zone are killed. In block 354, devices associated with the zone are un-configured. In block 356, network interfaces of the zone are unplumbed. In block 358, file systems for the zone are unmounted. In block 360, kernel data structures for the zone are destroyed. The above and other processing may be performed in bringing the zone from the Running state to the Installed state in one embodiment. An example of halting a zone according to one embodiment of the present invention is described below with reference to FIG. 4F.

Figure 3G:
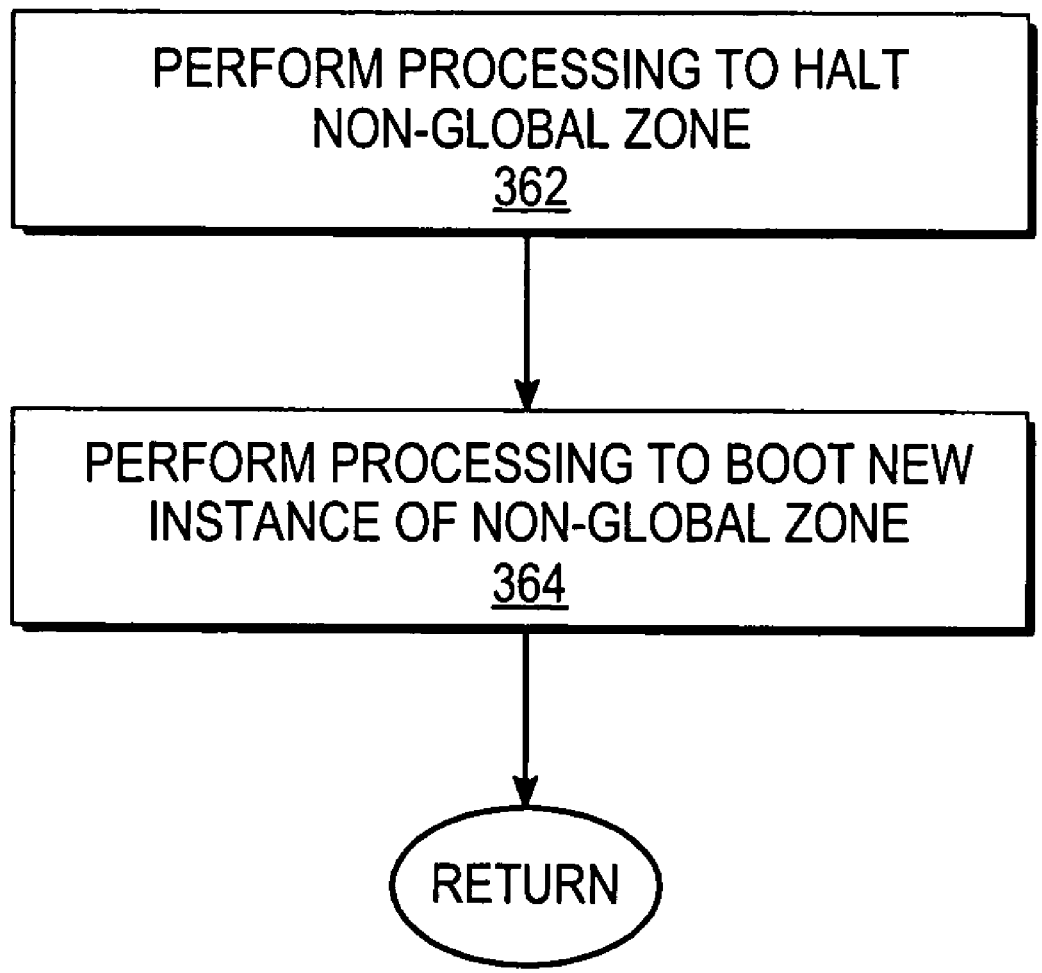

The processing depicted by FIG. 3G can be used to reboot a zone that is in the Running state in one embodiment of the present invention. Referring now to FIG. 3G, a general description of zone reboot processing in one representative embodiment is provided. In block 362 the zone is halted. In one embodiment, the zone is halted using processing analogous to that illustrated by FIG. 3F. In block 364, a new instance of the zone is created. In one embodiment, the zone instance may be created using processing analogous to that illustrated by FIG. 3E. The above and other processing may be performed in bringing the zone from the Running state to the Installed state and back to the Running state in one embodiment. An example of rebooting a zone according to one embodiment of the present invention is described below with reference to FIG. 4G.

FIG. 4A is an example listing of zones present in an example embodiment of the present invention. As shown by FIG. 4A, a listing of zones in operating system environment 100 may be obtained by entering a zoneadm list command 402. In one embodiment, the zoneadm list command returns information about the zones in a columnar format. As shown by FIG. 4A, list command 402 provides output including an ID column 401, a zone name column 403, a zone state column 405, and a file system path column 407 for the file system path associated with the zone. Alternative embodiments may display other information, or may display a subset of the information illustrated by FIG. 4A. In the embodiment illustrated by FIG. 4A, there are six zones in various states. A global zone, with zone id of 0, is in the Running state as indicated by line 404. A non-global zone, my-zone, is in the Configured state as shown by line 406. A second non-global zone, fun, is in the Installed state as shown by line 408. Since non-global zones my-zone and fun are not in the Ready state, these zones do not yet have an associated zone id. Other non-global zones, nofun, lucky and unlucky, having zone IDs 15, 7 and 13, respectively, are in the Ready, Running and Shutting_down states, respectively as indicated by lines 410, 412 and 414.

Referring to line 420 in FIG. 4A, a pgrep-1f zoneadm command is issued in order to obtain from operating system environment 100 an example list of processes with the name zoneadm in the various zones. Lines 422-426 indicate that the zoneadmd exists in three zones, nofun, in line 422, lucky, in line 424 and unlucky in line 426. Note that each instance of the zoneadmd process has a separate process identifier (i.e., 10819 in line 422, 10227 in line 424 and 10304 in line 426), since each instance is a separate process associated with each of the non-global zones. The three instances of the zoneadmd process in the non-global zones are capable of being displayed in FIG. 4A because the pgrep-1f zoneadmd command is prefixed by the global prefix to cause the command to be directed to the global zone 130, which has visibility of the processes in the individual non-global zones in the illustrated embodiment.

FIG. 4B illustrates an example of configuring a zone according to one embodiment of the present invention. In some embodiments, zone configuration can comprise creating and destroying zone configurations; adding resources to or removing them from a given configuration; setting properties for those resources; and informational query, verify, commit and revert operations for working with zone configurations. As shown in FIG. 4B, the global administrator begins a configuration session using a zonecfg command indicating the name of the zone to be configured, in this case my-zone, in line 430. In one embodiment, a create command may be used to create a zone configuration as indicated by line 432. A path may be set for the zone using a set command. For example, in line 434, a zone path/aux0/my-zone is set for my-zone. The global administrator may add resources to the zone configuration using the add command. In line 436, a network interface is added to the configuration using an "add net" command string. The global administrator may set properties of the resources once they are added using the set command. For example, in line 438, the global administrator sets a physical property of network interface to "hme0." In line 440, the global administrator sets the network address property of network interface to 129.146.126.203/24. The global administrator ends the configuration of the network interface using an "end" command in line 441. The global administrator can verify the configuration using a verify command, as indicated by line 442. After verification, the configuration may be committed using a commit command as shown in line 444. The command interface and configuration illustrated by FIG. 4B are merely one illustrative example of many possible commands and command interfaces that can be used in various embodiments of the present invention as will be readily apparent to those skilled in the art.

In one embodiment, the zone configuration process, zonecfg (1M), uses a project-private XML file to store configuration data. In alternative embodiments, a repository or other types of general directory-based storage can be used to store configuration information. In one embodiment, zone data comprises various resources, some of which have properties. The resource types of one embodiment include a zone name, a zone path, file systems, network interfaces, devices, resource controls and others. In one embodiment, each zone has a unique zone name.

In one embodiment, each zone has a path to its root directory relative to the global zone's root directory. In one embodiment, at installation time, this directory can be made to have restricted visibility; i.e., owned by the root and having a mode of 700. The zone's root path will be one level lower; the directory "root" under the zone path. This root directory will have the same ownership and permissions as the root directory in the global zone; i.e., owned by the root and having a mode of 755. Unprivileged users in the global zone will thus be prevented from traversing a non-global zone's file system hierarchy. One example of directories with restricted permissions would be a user whose home directory is writable only by the owner, but readable and executable by all, or mode 755, but a personal sub-directory thereof would contain files that are neither readable nor executable by anyone but the owner, or mode 700.

In one embodiment, each zone may have various file systems that may be mounted when the zone transitions from the Installed state to the Ready state. In one embodiment, each zone may have network interfaces that may be plumbed when the zone transitions from the Installed state to the Ready state. In one embodiment, each zone may have devices that may be configured when the zone transitions from the Installed state to the Ready state. In one embodiment, each zone may have resource controls that may be enabled when the zone transitions from the Installed state to the Ready state. Select embodiments may include additional devices and processes that are configured by zonecfg(1M). Some resource types have associated property types.

In one embodiment, a two-step configuration creation process is used, enabling a more simple configuration procedure. In such embodiments, resources may be added, then properties of those resources may be set. A configuration can be in an incomplete state, however, after a resource has been added but before properties are set. In one embodiment, the zonecfg (1M) command has a verify subcommand that reports any incompleteness in the configuration. The zonecfg(1M) command can also include checks to block an incomplete configuration from being committed to stable storage. Some embodiments can include one or more of the following example verification checks: ensuring that a given configuration has a zonepath specified, ensuring one or more filesystem resources are specified, and ensuring that each filesystem and network resource has any necessary properties specified. Some embodiments can include other verification checks as well.

FIG. 4C illustrates an example of installing a zone according to one embodiment of the present invention. Once a zone has been configured, the global administrator, for example, verifies that the zone can be installed safely and installs the zone. In one embodiment, zone installation comprises installing files used by the zone's root file system under the root path of the zone.

Referring now to FIG. 4C, the global administrator issues a zoneadm—z verify command for zone, my-zone, to verify that the zone is not yet installed in line 446. Because the zone my-zone has not been installed, operating system 100 returns an error message in line 448. In line 450, the global administrator uses a chmod command to change the access permissions for the specified directory, /aux0/my-zone, to ensure that at installation time, this directory will have restricted visibility, i.e., the directory is owned by the root, and permissions are set to mode 700 so that only the owner, root, may read or execute the files in this directory. In line 452, the global administrator verifies that the zone can be installed safely by issuing a zoneadm—z verify command for zone, my-zone. Since the system does not return an error message this time, in line 454, the global administrator installs the zone by issuing a zoneadm—z install command for zone, my-zone. In one embodiment, once the install completes, the global administrator can verify the status of the zone using the zoneadm list command to list the zones in the Installed state as illustrated by line 456. In one embodiment, the –i flag is used to request that the zones in the Installed state be listed, as illustrated by line 458 of FIG. 4C.

FIG. 4D illustrates an example of readying a zone according to one embodiment of the present invention. Once a zone has been installed, the zoneadm(1M) command can be used to cause the zone to enter the Ready state (using the ready command) or the Running state (using the boot command). Transitioning a non-global zone into the Ready state prepares the virtual platform to begin running user processes in that zone. A zoneadmd process and a zsched process can be started in order to manage processes within the zone. Zones in the Ready state do not have any user processes executing in them.

Referring now to FIG. 4D, the global administrator issues a zoneadm—z ready command for zone, my-zone, to initiate the process of readying the zone in line 460. In one embodiment, once the zone ready process completes, the global administrator can verify the status of the zone using the zoneadm list command to list the zones in the Ready state as illustrated by line 462. In one embodiment, the –v flag is used to request that the zones in the Ready state be listed. Line 464 of FIG. 4D illustrates that zone my-zone is in the Ready state, and has a path of /aux0/my-zone.

FIG. 4E illustrates an example of booting a zone according to one embodiment of the present invention. A zone transparently transitions through the Ready state if not already in the Ready state. The primary difference between a zone in the Ready state and a zone in the Running state is that a zone in the Running state has an init process started in the zone.

Referring now to FIG. 4E, the global administrator issues a zoneadm—z boot command for zone, my-zone, to initiate the process of booting the zone in line 466. In one embodiment, once the zone boot process completes, the global administrator can verify the status of the zone using the zoneadm list command to list the zones in the Running state as illustrated by line 468. Line 470 of FIG. 4E illustrates that zone my-zone is in the Running state, and has a path of /aux0/my-zone.

FIG. 4F illustrates an example of halting a zone according to one embodiment of the present invention. In the event that a global administrator wishes to shut down both the application environment and the virtual platform for a zone, the zoneadm halt may be used as illustrated by FIG. 4F. Halting a zone results in that zone being brought back to the Installed state. In some embodiments, one or more of killing all processes in the zone, unconfiguring devices associated with the zone, unplumbing network interfaces of the zone, unmounting file systems for the zone and destroying kernel data structures for the zone may be performed in bringing the zone to the Installed state from the Running state.

Referring now to FIG. 4F, the global administrator issues a zoneadm list command to list the zones present in the system in line 472. The system responds with line 474, which indicates that zone my-zone is in the Running state and has a path of /aux0/my-zone. In order to halt zone, my-zone, the global administrator issues a zoneadm—z halt command specifying my-zone, to initiate the process of halting the zone in line 476. In one embodiment, once the zone halt process completes, the global administrator can verify the status of the zone using the zoneadm list command to list the zones in the Installed state as illustrated by line 478. Line 480 of FIG. 4F illustrates that zone my-zone is in the Installed state, and has a path of /aux0/my-zone.

In the event that the system state associated with the zone cannot be destroyed, the halt operation may fail, leaving the zone in an intermediate state, somewhere between Running and Installed. In this state there are no user processes or kernel threads doing work on behalf of the zone, and none may be created. In one embodiment, an exception is raised so that the global administrator can intervene in cases where automatic shutdown procedures encounter errors.

FIG. 4G illustrates an example of rebooting a zone according to one embodiment of the present invention. In one embodiment, a global administrator uses a zoneadm reboot command to reboot a zone. This command will halt the zone, then boot it anew, going through analogous state transitions, as described above.

Referring now to FIG. 4G, the administrator issues a zoneadm list command to list the zones present in the system in line 482. The system responds with line 484, which indicates that zone my-zone is in the Running state and has a zone ID of 1 and a path of /aux0/my-zone. In order to reboot zone, my-zone, a global administrator issues a zoneadm—z reboot command specifying my-zone, to initiate the process of rebooting the zone in line 486. In one embodiment, once the zone reboot process completes, the global administrator can verify the status of the zone using the zoneadm list command to list the zones in the system as illustrated by line 488. Line 490 of FIG. 4G illustrates that zone my-zone is in the Running state and has a path of /aux0/my-zone. However, the new instance of zone, my-zone has been assigned a new zone ID of 2.

Hardware Overview

Figure 5:
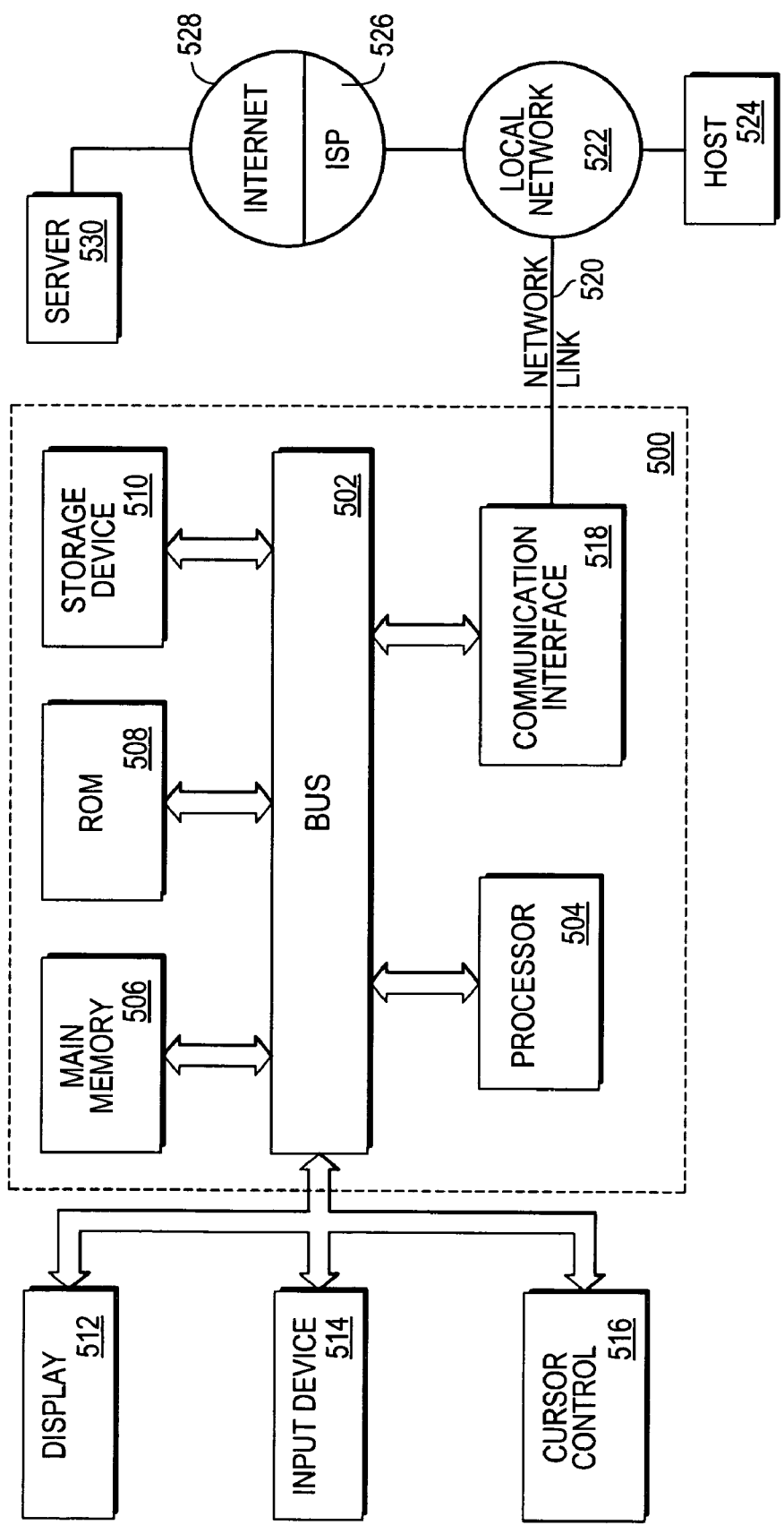
FIG. 5 is a hardware block diagram of an example computer system, which may be used to embody one or more components of an embodiment of the present invention.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may also be a medium (e.g. air) that enables signals to be capacitively exchanged between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. In this instance, the bus 502 would be the medium (such as air) that enables this capacitive communication to take place. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. A machine-readable medium may take many forms, including but not limited to machine-readable storage media (e.g. non-volatile media, volatile media, etc.), and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A machine-implemented method, comprising:
   establishing, within a global operating system environment provided by an operating system (OS) kernel, a first non-global zone which serves as a first virtual platform for supporting and isolating user processes, wherein the first non-global zone is a separate and distinct OS partition of the global operating system environment having a first zone identifier associated therewith, and wherein the first non-global zone is established and exists without requiring any user processes to be running therein;
   establishing, within the global operating system environment, a second non-global zone which serves as a second virtual platform for supporting and isolating user processes, wherein the second non-global zone is a separate and distinct OS partition of the global operating system environment having a second zone identifier associated therewith, and wherein the second non-global zone is established and exists without requiring any user processes to be running therein;
   executing a first set of one or more user processes within the first non-global zone;
   executing a second set of one or more user processes within the second non-global zone; and
   isolating the first set of one or more user processes within the first non-global zone and the second set of one or more user processes within the second non-global zone such that the first set of one or more user processes cannot access processes in the second non-global zone and the second set of one or more user processes cannot access processes in the first non-global zone;
   wherein the first and second non-global zones are established by the OS kernel, and wherein the OS kernel enforces zone boundaries to isolate the first set of one or more user processes within the first non-global zone and the second set of one or more user processes within the second non-global zone.

2. The method of claim 1, wherein the OS kernel provides services that are invoked by the first set of one or more user processes, and wherein the services are invoked by the first set of one or more user processes through the first virtual platform.

3. The method of claim 1,
   wherein a first set of resources are associated with the first non-global zone and a second set of resources are associated with the second non-global zone;
   wherein the first set of resources are accessed by the first set of one or more user processes through the first virtual platform and the second set of resources are accessed by the second set of one or more user processes through the second virtual platform; and
   wherein the first set of resources and the second set of resources each include one or more resources from the group consisting of a network interface, a communications interface, a file system, a system console, a DASD address, and an operating system service process.

4. The method of claim 3, wherein isolating the first set of one or more user processes within the first non-global zone and the second set of one or more user processes within the second non-global zone further comprises:
   preventing the first set of one or more user processes from accessing the second set of resources associated with the second non-global zone; and
   preventing the second set of one or more user processes from accessing the first set of resources associated with the first non-global zone.

5. The method of claim 3, wherein executing the first set of one or more user processes within the first non-global zone causes a first application environment to be established within the first non-global zone, and wherein the method further comprises:
   receiving a command to halt the first non-global zone;
   in response to the command to halt the first non-global zone:
      terminating all user processes executing within the first non-global zone, thereby terminating the first application environment; and
      disassociating the first set of resources from the first non-global zone;
   wherein the second non-global zone is not affected by the command to halt the first non-global zone.

6. The method of claim 3, wherein executing the first set of one or more user processes within the first non-global zone causes a first application environment to be established within the first non-global zone, and wherein the method further comprises:
   receiving a command to halt the first non-global zone;
   in response to the command to halt the first non-global zone:
      terminating all user processes executing within the first non-global zone, thereby terminating the first application environment; and
      performing one or more tasks from the group consisting of stopping a scheduler process, unmounting one or more file systems, closing one or more network interfaces, and removing configurations for devices associated with the first non-global zone;
   wherein the second non-global zone is not affected by the command to halt the first non-global zone.

7. The method of claim 1, further comprising:
   allowing a first administrator to manage processes and resources within the first non-global zone, wherein the first administrator is not allowed to manage processes and resources within the second non-global zone; and
   allowing a second administrator to manage processes and resources within the second non-global zone, wherein the second administrator is not allowed to manage processes and resources within the first non-global zone.

8. The method of claim 1, wherein establishing the first non-global zone comprises:
   assigning the first zone identifier, plumbing one or more network interfaces, and mounting one or more file systems;
   wherein establishing the first non-global zone does not include executing user processes within the first non-global zone.

9. The method of claim 8, wherein the configuration information comprises one or more parameters from the group consisting of a zone name, a path to a root directory for the first non-global zone, specification of one or more file systems to be mounted when the first non-global zone is created, specification of one or more network interfaces, specification of one or more devices to be configured when the first non-global zone is created, and specification of resource controls to be imposed on the first non-global zone.

10. The method of claim 1, wherein executing the first set of one or more user processes within the first non-global zone comprises:
   executing an initialization process; and
   initializing, by the initialization process, execution of the first set of one or more user processes.

11. A machine-readable storage medium storing one or more sets of instructions which, when executed by one or more processors, cause the one or more processors to perform the steps of:
   establishing, within a global operating system environment provided by an operating system (OS) kernel, a first non-global zone which serves as a first virtual platform for supporting and isolating user processes, wherein the first non-global zone is a separate and distinct OS partition of the global operating system environment having a first zone identifier associated therewith, and wherein the first non-global zone is established and exists without requiring any user processes to be running therein;
   establishing, within the global operating system environment, a second non-global zone which serves as a second virtual platform for supporting and isolating user processes, wherein the second non-global zone is a separate and distinct OS partition of the global operating system environment having a second zone identifier associated therewith, and wherein the second non-global zone is established and exists without requiring any user processes to be running therein;
   executing a first set of one or more user processes within the first non-global zone;
   executing a second set of one or more user processes within the second non-global zone; and
   isolating the first set of one or more user processes within the first non-global zone and the second set of one or more user processes within the second non-global zone such that the first set of one or more user processes cannot access processes in the second non-global zone and the second set of one or more user processes cannot access processes in the first non-global zone;
   wherein the first and second non-global zones are established by the OS kernel, and wherein the OS kernel enforces zone boundaries to isolate the first set of one or more user processes within the first non-global zone and the second set of one or more user processes within the second non-global zone.

12. The machine-readable storage medium of claim 11, wherein the OS kernel provides services that are invoked by the first set of one or more user processes, and wherein the services are invoked by the first set of one or more user processes through the first virtual platform.

13. The machine-readable storage medium of claim 11,
   wherein a first set of resources are associated with the first non-global zone and a second set of resources are associated with the second non-global zone;
   wherein the first set of resources are accessed by the first set of one or more user processes through the first virtual platform and the second set of resources are accessed by the second set of one or more user processes through the second virtual platform; and
   wherein the first set of resources and the second set of resources each include one or more resources from the group consisting of a network interface, a communications interface, a file system, a system console, a DASD address, and an operating system service process.

14. The machine-readable storage medium of claim 13, wherein isolating the first set of one or more user processes within the first non-global zone and the second set of one or more user processes within the second non-global zone further comprises:

preventing the first set of one or more user processes from accessing the second set of resources associated with the second non-global zone; and preventing the second set of one or more user processes from accessing the first set of resources associated with the first non-global zone.

15. The machine-readable storage medium of claim 13, wherein executing the first set of one or more user processes within the first non-global zone causes a first application environment to be established within the first non-global zone, and wherein the machine-readable storage medium further stores one or more sets of instructions for causing the one or more processors to perform the steps of:

receiving a command to halt the first non-global zone;

in response to the command to halt the first non-global zone:

terminating all user processes executing within the first non-global zone, thereby terminating the first application environment; and disassociating the first set of resources from the first non-global zone;

wherein the second non-global zone is not affected by the command to halt the first non-global zone.

16. The machine-readable storage medium of claim 13, wherein executing the first set of one or more user processes within the first non-global zone causes a first application environment to be established within the first non-global zone, and wherein the machine-readable storage medium further stores one or more sets of instructions for causing the one or more processors to perform the steps of:

receiving a command to halt the first non-global zone;

in response to the command to halt the first non-global zone:

terminating all user processes executing within the first non-global zone, thereby terminating the first application environment; and performing one or more tasks from the group consisting of stopping a scheduler process, unmounting one or more file systems, closing one or more network interfaces, and removing configurations for devices associated with the first non-global zone;

wherein the second non-global zone is not affected by the command to halt the first non-global zone.

17. The machine-readable storage medium of claim 11, wherein the machine-readable storage medium further stores one or more sets of instructions for causing the one or more processors to perform the steps of:

allowing a first administrator to manage processes and resources within the first non-global zone, wherein the first administrator is not allowed to manage processes and resources within the second non-global zone; and allowing a second administrator to manage processes and resources within the second non-global zone, wherein the second administrator is not allowed to manage processes and resources within the first non-global zone.

18. The machine-readable storage medium of claim 11, wherein establishing the first non-global zone comprises:

assigning the first zone identifier, plumbing one or more network interfaces, and mounting one or more file systems;

wherein establishing the first non-global zone does not include executing user processes within the first non-global zone.

19. The machine-readable storage medium of claim 18, wherein the configuration information comprises one or more parameters from the group consisting of a zone name, a path to a root directory for the first non-global zone, specification of one or more file systems to be mounted when the first non-global zone is created, specification of one or more network interfaces, specification of one or more devices to be configured when the first non-global zone is created, and specification of resource controls to be imposed on the first non-global zone.

20. The machine-readable storage medium of claim 11, wherein executing the first set of one or more user processes within the first non-global zone comprises:

executing an initializer process; and initializing, by the initializer process, execution of the first set of one or more user processes.

21. An apparatus comprising:

one or more processors configured to implement:

means for establishing, within a global operating system environment provided by an operating system (OS) kernel, a first non-global zone which serves as a first virtual platform for supporting and isolating user processes, wherein the first non-global zone is a separate and distinct OS partition of the global operating system environment having a first zone identifier associated therewith, and wherein the first non-global zone is established and exists without requiring any user processes to be running therein;

means for establishing, within said global operating system environment, a second non-global zone which serves as a second virtual platform for supporting and isolating user processes, wherein the second non-global zone is a separate and distinct OS partition of the global operating system environment having a second zone identifier associated therewith, and wherein the second non-global zone is established and exists without requiring any user processes to be running therein;

means for executing a first set of one or more user processes within the first non-global zone;

means for executing a second set of one or more user processes within the second non-global zone; and means for isolating the first set of one or more user processes within the first non-global zone and the second set of one or more user processes within the second non-global zone such that the first set of one or more user processes cannot access processes in the second non-global zone and the second set of one or more user processes cannot access processes in the first non-global zone;

wherein the first and second non-global zones are established by the OS kernel, and wherein the OS kernel enforces zone boundaries to isolate the first set of one or more user processes within the first non-global zone and the second set of one or more user processes within the second non-global zone.

22. The apparatus of claim 21, wherein a first set of resources are associated with the first non-global zone and a second set of resources are associated with the second non-global zone;

wherein the first set of resources are accessed by the first set of one or more user processes through the first virtual platform and the second set of resources are accessed by the second set of one or more user processes through the second virtual platform; and wherein the first set of resources and the second set of resources each include one or more resources from the group consisting of a network interface, a communications interface, a file system, a system console, a DASD address, and an operating system service process.

23. The apparatus of claim 22, wherein the means for isolating the first set of one or more user processes within the first non-global zone and the second set of one or more user processes within the second non-global zone further comprises:
   means for preventing the first set of one or more user processes from accessing the second set of resources associated with the second non-global zone; and
   means for preventing the second set of one or more user processes from accessing the first set of resources associated with the first non-global zone.

24. The apparatus of claim 22, wherein executing the first set of one or more user processes within the first non-global zone causes a first application environment to be established within the first non-global zone, and wherein the apparatus further comprises:
   means for receiving a command to halt the first non-global zone;
   in response to the command to halt the first non-global zone:
      means for terminating all user processes executing within the first non-global zone, thereby terminating the first application environment; and
      means for disassociating the first set of resources from the first non-global zone;
   wherein the second non-global zone is not affected by the command to halt the first non-global zone.

25. The apparatus of claim 22, wherein executing the first set of one or more user processes within the first non-global zone causes a first application environment to be established within the first non-global zone, and wherein the apparatus further comprises:
   means for receiving a command to halt the first non-global zone;
   in response to the command to halt the first non-global zone:
      means for terminating all user processes executing within the first non-global zone, thereby terminating the first application environment; and
      means for performing one or more tasks from the group consisting of stopping a scheduler process, unmounting one or more file systems, closing one or more network interfaces, and removing configurations for devices associated with the first non-global zone;
   wherein the second non-global zone is not affected by the command to halt the first non-global zone.

26. The apparatus of claim 21, wherein the means for establishing the first non-global zone comprises:
   means for assigning the first zone identifier, plumbing one or more network interfaces, and mounting one or more file systems;
   wherein establishing the first non-global zone does not include executing user processes within the first non-global zone.

27. The apparatus of claim 26, wherein the configuration information comprises one or more parameters from the group consisting of a zone name, a path to a root directory for the first non-global zone, specification of one or more file systems to be mounted when the first non-global zone is created, specification of one or more network interfaces, specification of one or more devices to be configured when the first non-global zone is created, and specification of resource controls to be imposed on the first non-global zone.

* * * * *